Figure 1:
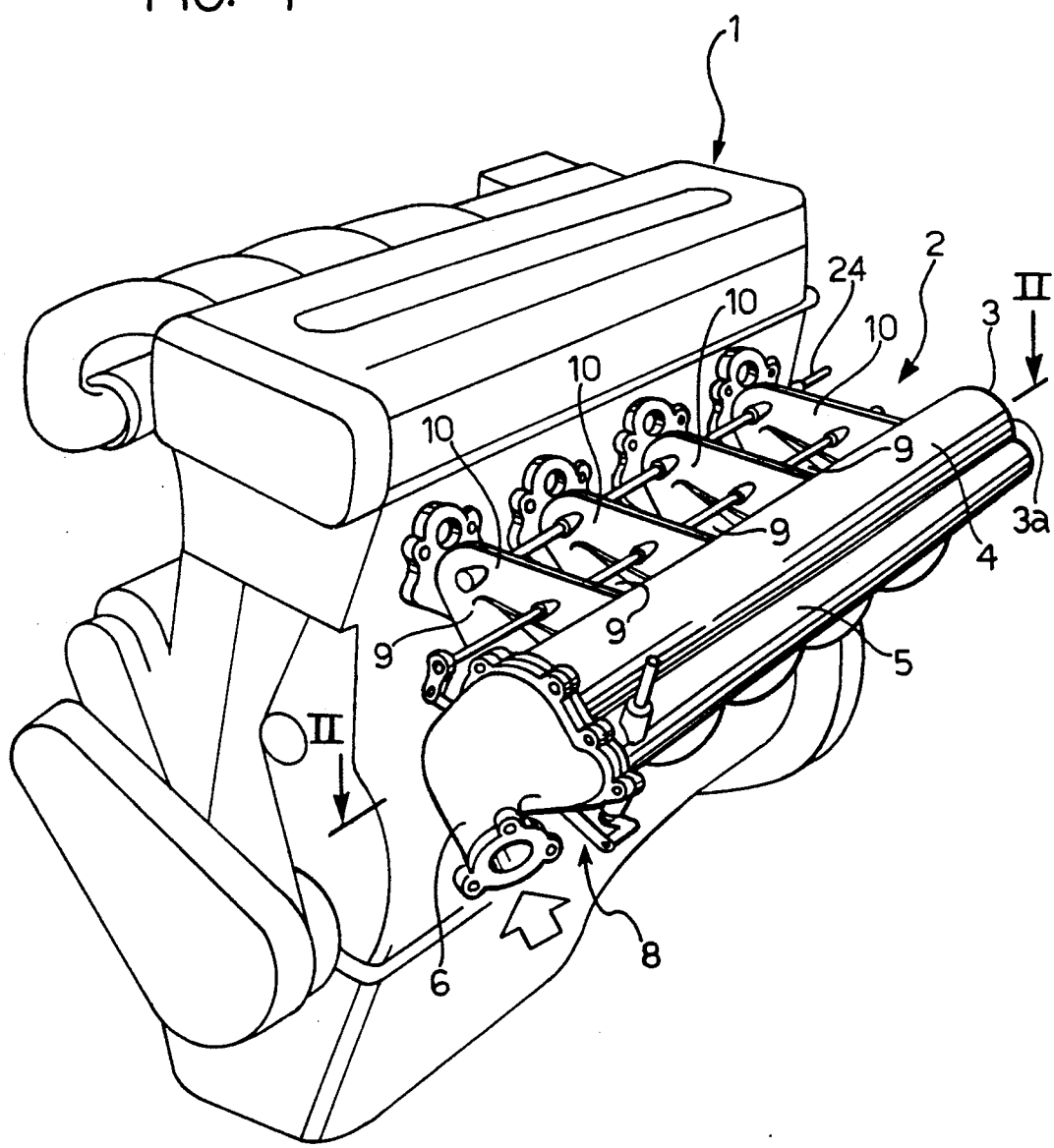

United States Patent [19]

Piccini

[11] Patent Number: 5,105,774
[45] Date of Patent: Apr. 21, 1992

[54] INTAKE SYSTEM FOR MULTICYLINDER INTERNAL COMBUSTION ENGINES FOR MOTOR VEHICLES

[75] Inventor: Pietro Piccini, Collegno, Italy

[73] Assignee: Fiat Auto SPA, Turin, Italy

[21] Appl. No.: 711,776

[22] Filed: Jun. 7, 1991

[30] Foreign Application Priority Data

Jun. 8, 1990 [IT] Italy ............................ 67419 A/90

[51] Int. Cl.⁵ .......................................... F02M 35/10
[52] U.S. Cl. ................................................ 123/52 MB
[58] Field of Search ......... 123/52 M, 52 MB, 52 MC, 123/52 MF, 52 ML, 52 MV

[56] References Cited

U.S. PATENT DOCUMENTS 4,854,271 8/1989 Miyano et al. ................. 123/52 MV
4,862,840 9/1989 Matsunaga et al. .............. 123/52 M

FOREIGN PATENT DOCUMENTS 2038415 7/1980 United Kingdom ............. 123/52 M

Primary Examiner—David A. Okonsky
Attorney, Agent, or Firm—Sughrue, Mion, Zinn, Macpeak & Seas

[57] ABSTRACT

A differentiated intake system for multicylinder internal combustion engines in which the high-speed inlet pipes and the low-speed inlet pipes communicate with two separate high-speed and low-speed manifolds, respectively. Communication between the cylinders and the low-speed and high-speed pipes is controlled by a deflector valve, there being a single first butterfly valve at the inlet of the high-speed manifold and a plurality of second butterfly valves each in a respective low-speed inlet pipe. The first and second butterfly valves are operated simultaneously by means of a common actuator device.

3 Claims, 3 Drawing Sheets

INTAKE SYSTEM FOR MULTICYLINDER INTERNAL COMBUSTION ENGINES FOR MOTOR VEHICLES

DESCRIPTION

The present invention relates in general to an intake system for multicylinder internal combustion engines for motor vehicles. More particularly, the invention relates to a differentiated intake system of the type including, for each cylinder, a high-speed inlet pipe and a low-speed inlet pipe having respective outlet ends which converge into an inlet duct to the cylinder, and a deflector valve associated with the inlet duct and movable selectively between two positions in each of which one of the inlet pipes is open and the other is closed, and in which the inlet ends of the inlet pipes communicate with inlet chamber means with which valve means are operatively associated for controlling the inlet flow.

FR-A-1,395,660 describes an inlet system of the type defined above in which the inlet ends of the high-speed and low-speed inlet pipes communicate with a common manifold and in which the control valve means are constituted by a single butterfly valve at the inlet of the common manifold.

This solution is inadequate since the volume of the common manifold, which is dimensioned in dependence on the intake at low speeds, is obviously not ideal for the intake at high speeds. Moreover, the use of a single butterfly valve produces a uniform distribution of the inlet flow in the high-speed and low-speed pipes and this may cause the engine to run unevenly, particularly at low speeds.

In order to avoid these problems, the subject of the invention is an intake system of the type defined at the beginning, characterized in that the inlet chamber means include two separate chambers defined respectively by a high-speed manifold communicating with the high-speed inlet pipes and a low-speed manifold communicating with the low-speed inlet pipes, and in that the control valve means include a single first butterfly valve at the inlet of the high-speed manifold and a plurality of second butterfly valves each near the inlet end of a respective low-speed inlet pipe, a single actuator device being provided for simultaneously controlling the opening and closing of the first and second butterfly valves.

The high-speed manifold normally has a smaller volume than the low-speed manifold.

Figure 2:
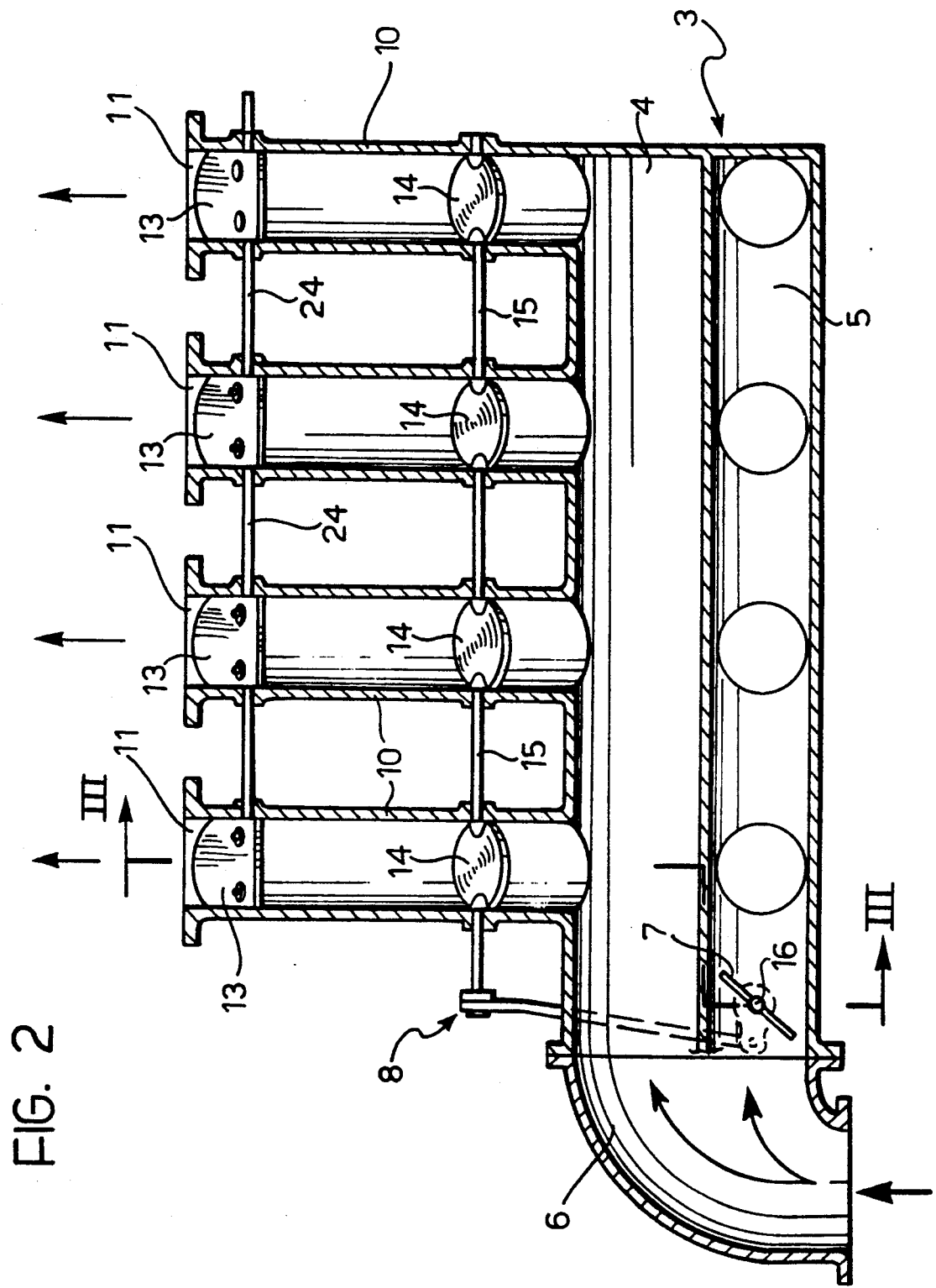
Figure 3:
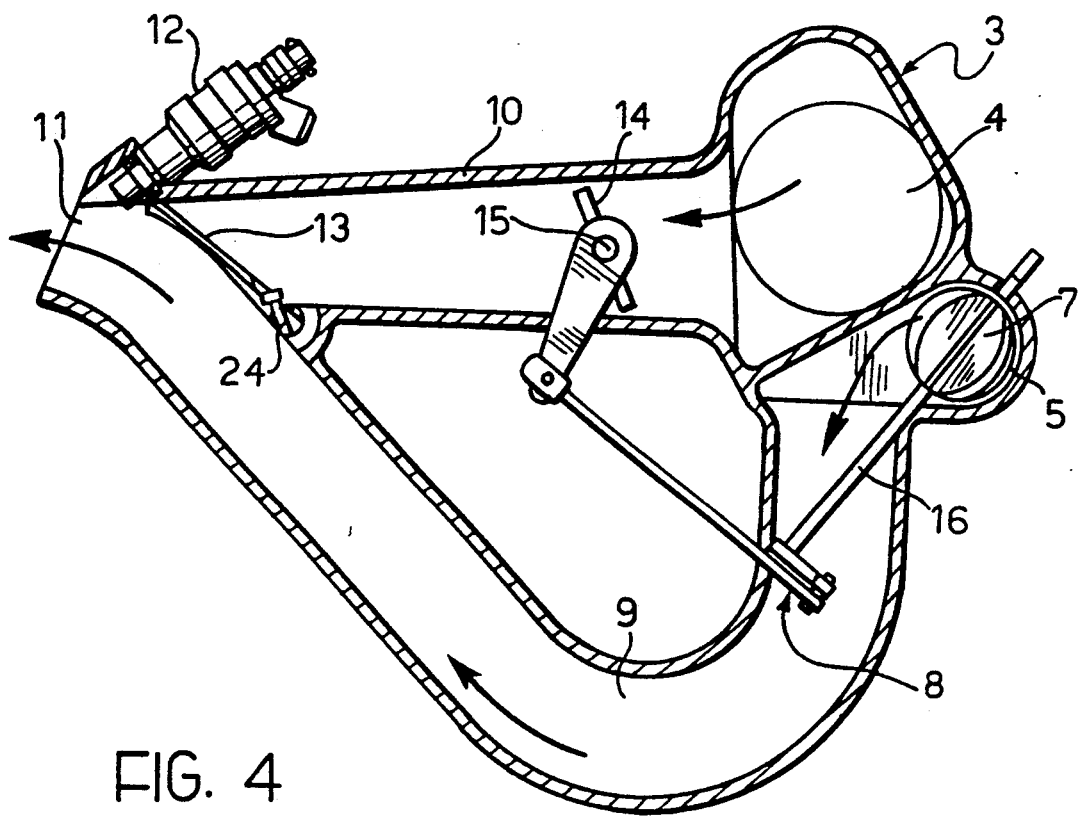
Figure 4:
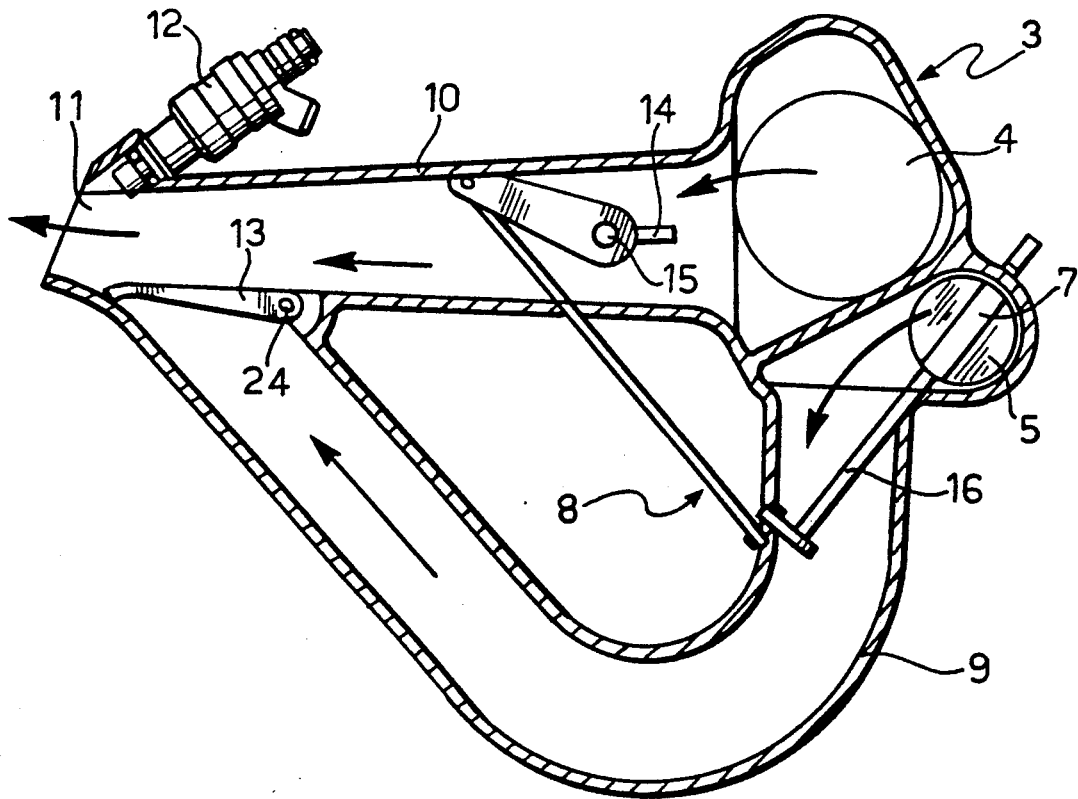

The invention will now be described in detail with reference to the appended drawings, provided purely by way of non-limiting example, in which:

FIG. 1 is a schematic perspective view of an internal combustion engine with an intake system according to the invention, FIG. 2 is a horizontal section taken on the line II—II of FIG. 1, on an enlarged scale, FIG. 3 is a cross-section taken on the line III—III of FIG. 2 with the intake system in a first operative configuration, and FIG. 4 is a view similar to FIG. 3, showing the intake system in a second operative configuration.

With reference to the drawings, a multicylinder internal combustion engine (with four cylinders in the embodiment illustrated) for motor vehicles is generally indicated 1. An intake system according to the invention, generally indicated 2, is associated with the supply portion of the engine 1. This system comprises a longitudinal tubular body 3 defining an first upper manifold 4 of larger cross-section and a second lower manifold 5 of smaller cross-section. The two manifolds 4 and 5, which will be referred to below as the low-speed manifold and the high-speed manifold respectively, are equal in length and herefore have a larger volume and a smaller volume respectively. The manifolds 4 and 5 are closed at one end 3a of the body 3 whilst at the opposite end they are connected to a tubular air-inlet connector 6 for connection in turn to an air filter, not shown. A butterfly valve 7 is inserted in the region of the high-speed manifold 5 near the inlet connector 6 and is carried by a shaft 16 rotated by a kinematic control mechanism 8 which is piloted, in conventional manner, by the accelerator of the engine 1. Obviously, the butterfly valve 7 controls the air-flow from the inlet connector 6 to the high-speed manifold 5.

The inlet connector 6, however, communicates permanently with the low-speed manifold 4.

The high-speed manifold 5 communicates with a plurality of lower inlet pipes 9 equal to the number of cylinders of the engine 1. The low-speed manifold 4 communicates with a plurality of upper inlet pipes 10, also equal to the number of cylinders of the engine 1. The upper pipes 10, which will be referred to below as the low-speed pipes, are straight whilst the lower pipes 9, which will be referred to below as the high-speed pipes, are elbow-shaped and are therefore longer than the low-speed pipes 10. In the embodiment illustrated, the pipes 9 and 10 have substantially the same cross-sections: however, according to an alternative embodiment, not shown, the low-speed pipes 10 may have larger cross-sections than the high-speed pipes 9.

The pipes 9 and 10 of each pair associated with a respective cylinder of the engine 1 converge into a common inlet duct 11 which communicates with the inlet valve of the cylinder and which, in the embodiment illustrated, has an associated fuel injector 12.

A deflector valve 13 is provided in the region where the inlet pipes 9 and 10 converge and is mounted, with the deflector valves 13 of the other pairs of pipes 9 and 10, on a common rotatable operating shaft 24. Each deflector valve 13 is movable angularly between the position shown in FIG. 13, in which the inlet duct 11 does not communicate with the low-speed pipe 10 but is in communication with the high-speed pipe 9, and that shown in FIG. 4, in which the inlet duct 11 communicates with the low-speed duct 10, whilst the inlet duct 11 is not in communication with the high-speed duct. The deflector valves 13 are rotated by the rotatable shaft 14 in dependence on the speed of the engine, in a manner known, for example, from FR-A-1,395,660.

A respective butterfly valve 14 is provided in each low-speed pipe 10 near the region in which it communicates with the low-speed manifold 4. The butterfly valves 14 are carried by a common shaft 15 and are operated simultaneously with the butterfly valve 7 by means of the same kinematic control mechanism 8 so that the valves 14 and the valve 7 open and close simultaneously.

In operation, when the engine 1 is running low speeds, the deflector valve 13 is in the position shown in FIG. 3 and the air-flow supplied to the inlet duct 11 thus comes from the high-speed manifold 5 and the respective high-speed inlet pipes 9, whilst the flow from the low-speed manifold 4 and the respective low-speed pipes 10 is obstructed.

When the engine 1 is running at high speeds, the deflector valve 13 is in the position of FIG. 4, whereby the air-flow supplied to the inlet duct 11 is that coming from the low-speed manifold 4 and the respective low-speed inlet pipes 10, whilst the flow from the high-speed manifold 5 and the respective high-speed pipes 9 is interrupted.

The use of two inlet manifolds 4, 5 and the arrangement of the butterfly valves 7 and 14 thus ensures an optimum air-intake whatever the speed of the engine.

Naturally, the details of construction and forms of embodiment may be varied widely with respect to those described and illustrated, without thereby departing from the scope of the present invention.

I claim:

1. An intake system for multicylinder internal combustion engines for motor vehicles, including, for each cylinder, a high-speed inlet pipe and a low-speed inlet pipe which converge into an inlet duct to the cylinder, said inlet pipes having respective inlet ends, and a deflector valve associated with the inlet duct and movable selectively between two positions in each of which one of the inlet pipes is open and the other is closed, and in which the inlet ends of the inlet pipes communicate with inlet chamber means with which valve means are operatively associated for controlling the inlet flow, wherein the inlet chamber means include two separate chambers defined respectively by a high-speed manifold having an inlet and communicating with the high-speed inlet pipes, and a low-speed manifold communicating with the low-speed inlet pipes, and wherein the control valve means include a first single butterfly valve at the inlet of the high-speed manifold and a plurality of second butterfly valves each near the inlet end of a respective low-speed inlet pipe, a single actuator device being provided for simultaneously controlling the opening and closing of the first and second butterfly valves.

2. An intake system according to claim 1, wherein the high-speed manifold has a smaller volume than the low-speed manifold.

3. An intake system according to claim 1, wherein the high-speed inlet pipes are longer than the low-speed inlet pipes.

* * * * *